United States Patent [19]

Stokes

[11] Patent Number: 5,122,024
[45] Date of Patent: Jun. 16, 1992

[54] CARRIER FOR THREE WHEELED VEHICLE

[75] Inventor: Robert S. Stokes, Clearwater, Fla.

[73] Assignee: All Purpose Manufacturing Corporation, Clearwater, Fla.

[21] Appl. No.: 613,600

[22] Filed: Nov. 13, 1990

[51] Int. Cl.⁵ .............................................. B60P 9/00
[52] U.S. Cl. .................................. 414/462; 414/537; 414/540; 414/917; 414/921; 410/3; 410/7; 410/120
[58] Field of Search .................. 410/2, 3, 4, 7, 120; 414/462, 537, 540, 917, 921

[56] References Cited

U.S. PATENT DOCUMENTS

| | | | |
|---|---|---|---|
| 3,638,813 | 2/1972 | Strong | 414/917 X |
| 3,700,123 | 10/1972 | Corley, Jr. | 414/917 X |
| 3,931,903 | 1/1976 | Johnson | 414/462 |
| 4,072,257 | 2/1978 | Hall | 410/3 X |
| 4,407,624 | 10/1983 | Kingston | 414/917 X |
| 4,456,421 | 6/1984 | Robson | 414/917 X |
| 4,616,972 | 10/1986 | Mc Farland | 414/462 X |
| 4,671,729 | 6/1987 | McFarland | 414/462 |
| 4,705,448 | 11/1987 | Mungons | 414/462 |
| 4,738,581 | 4/1988 | Kuhlman | 414/462 |
| 4,741,660 | 5/1988 | Kent | 414/462 |
| 4,752,177 | 6/1988 | Zenna | 410/3 X |
| 4,808,056 | 2/1989 | Oshima | 414/462 |
| 5,011,361 | 4/1991 | Peterson | 414/462 |

FOREIGN PATENT DOCUMENTS

| | | | |
|---|---|---|---|
| 57-186541 | 11/1982 | Japan | 414/921 |
| 2-231239 | 9/1990 | Japan | 414/540 |

Primary Examiner—Robert J. Spar
Assistant Examiner—Robert S. Katz
Attorney, Agent, or Firm—Joseph C. Mason, Jr.; Ronald E. Smith

[57] ABSTRACT

An apparatus attached to the trailing end of a passenger vehicle that carries a small three wheeled vehicle of the type used by people who have difficulty in walking. Three ramps in triangular array are supported by a support assembly that is raised and lowered by a small motor. The raising and lowering is accomplished by a telescoping member that causes a linkage apparatus to lift the ramp members when the telescoping member is extended and to lower the ramp members when the telescoping member is retracted. The profile of the apparatus is low in that it is positioned below the bottom edge of a station wagon rear door and does not interfere with the opening of that door. A hinge allows folding of the apparatus into a generally vertical plane when not in use.

20 Claims, 6 Drawing Sheets

CARRIER FOR THREE WHEELED VEHICLE

TECHNICAL FIELD

This invention relates, generally, to devices that enable small vehicles to be transported by a larger vehicle. More particularly, it relates to an apparatus attachable to the back of the passenger vehicle that carries a small vehicle of the type used by individuals for whom walking is difficult.

BACKGROUND ART

People for whom walking is painful or impossible often purchase a small three wheeled battery powered vehicle to increase their mobility. Such vehicles can easily be used inside the home or out of doors in the vicinity of the home, but they cannot travel over long distances and are illegal to operate on public highways. Accordingly, when the owner of such a vehicle wants to shop in a mall, visit a state fairground, or the like, it is necessary to transport the vehicle to its place of intended use. Owners of trucks or other vehicles can carry such small vehicles without using any special equipment, but owners of passenger vehicles such as cars, station wagons, vans, hatchbacks, pickup trucks and the like must purchase a vehicle carrier to transport the smaller vehicle.

Quite a few patents have been awarded on such carrying devices. For example, U.S. Pat. No. 4,705,448 to Mungons shows a three-wheeled vehicle carrier apparatus for connection to the rear of a motor vehicle. The carrier apparatus is pivotal from a horizontal plane to a vertical storage position. U.S. Pat. No. 4,741,660 to Kent includes a motorized lift mechanism.

If these and other devices are attached to the rear of station wagons, vans, hatchbacks and the like, they block the rear door so that it cannot be opened. The whole point of purchasing such vehicles, for many people, is to gain the cargo space provided thereby and to gain access to that space through the rear door of the vehicle, of course. If the rear door is rendered useless by the attachment of a vehicle carrier apparatus of the type currently commercially available, the investment in the station wagon is wasted to some extent.

Accordingly, there is a clear need for a three-wheeled vehicle carrier means attachable to the rear end of a passenger vehicle which does not adversely affect the utility and hence the value of the vehicle when attached thereto. This clear need has persisted for a number of years, but no machine designers have been able to produce such a carrier that allows free and unrestricted opening of a vehicle rear door when the carrier is operatively installed.

It is therefore indisputable that the prior art, when considered as a whole in accordance with the requirements of law, neither teaches nor suggests how the art could be improved and how the serious limitations thereof could be overcome.

DISCLOSURE OF INVENTION

The longstanding but heretofore unfulfilled need for a vehicle carrier that does not disable the normal functioning of the vehicle to which it is attached is now provided in the form a three-wheeled carrier that has a low profile and which is disposed in non-interfering relation to the rear door of a vehicle when operatively installed.

The novel structure includes three coplanar ramps in triangular array that receive and support the three wheels of the vehicle to be transported. The ramps are constructed so that the vehicle is easily driven thereonto when said ramps are lowered to the level of the support surface for the small vehicle.

The ramps and related parts are raised and lowered by a linkage system of such low profile that it does not block the opening of a station wagon rear door even though it is mounted just below said rear door. The linkage system has the power to lift and lower over three hundred pounds easily, which means that it can easily handle even the heaviest commercially available three-wheeled vehicles.

The linkage system includes an "L"-shaped linkage assembly. A telescoping member engages the free end of the truncate part of the "L"-shaped member and causes it to pivot. Related linkage members provide the needed strength and leverage to allow trouble-free operation of the apparatus.

It is therefore understood that a primary object of this invention is to pioneer the art of low profile vehicle carriers.

More particularly, a major object is to provide such a carrier that does not impair the value of the vehicle to which it is attached.

A more general object is to provide to the consuming public a three or four-wheeled vehicle carrier of sturdy construction, low cost, and easy operation.

These and other important objects, advantages, and features of the invention will become apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

BEST MODES FOR CARRYING OUT THE INVENTION

Figure 1:
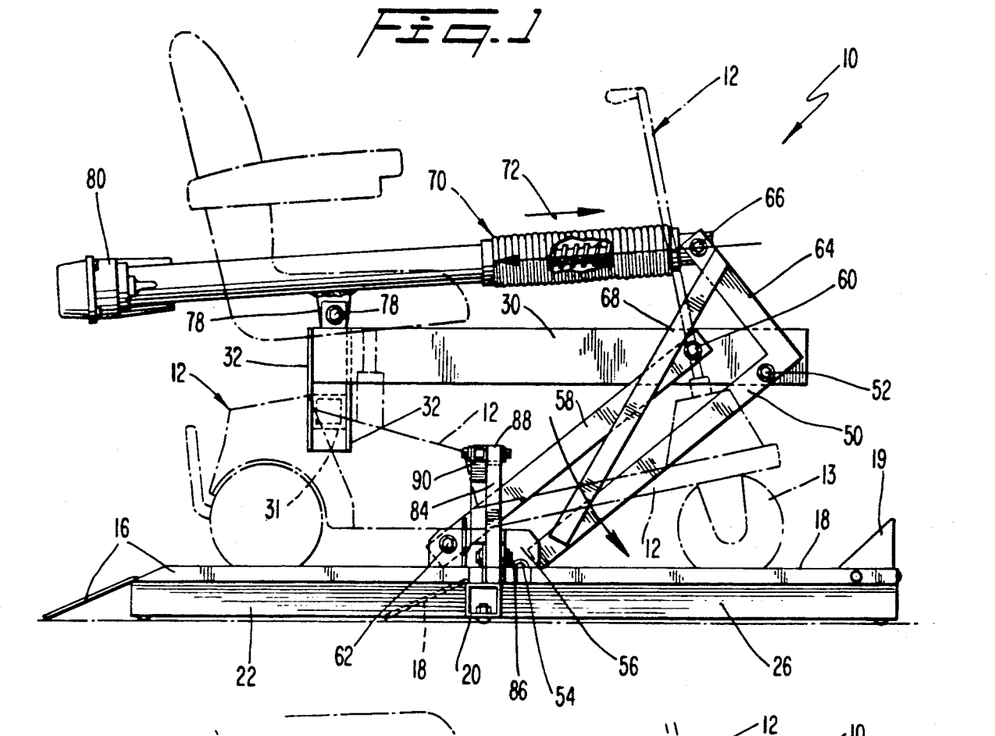
FIG. 1 is a side elevational view of the vehicle carrier in its lowered configuration, showing a typical three-wheeled vehicle in phantom lines.

Referring now to FIG. 1, it will there be seen that the novel apparatus is denoted as a whole by the reference numeral 10. A three-wheeled vehicle supported by apparatus 10 is shown in phantom lines and is denoted as a whole by the reference numeral 12.

Figure 3:
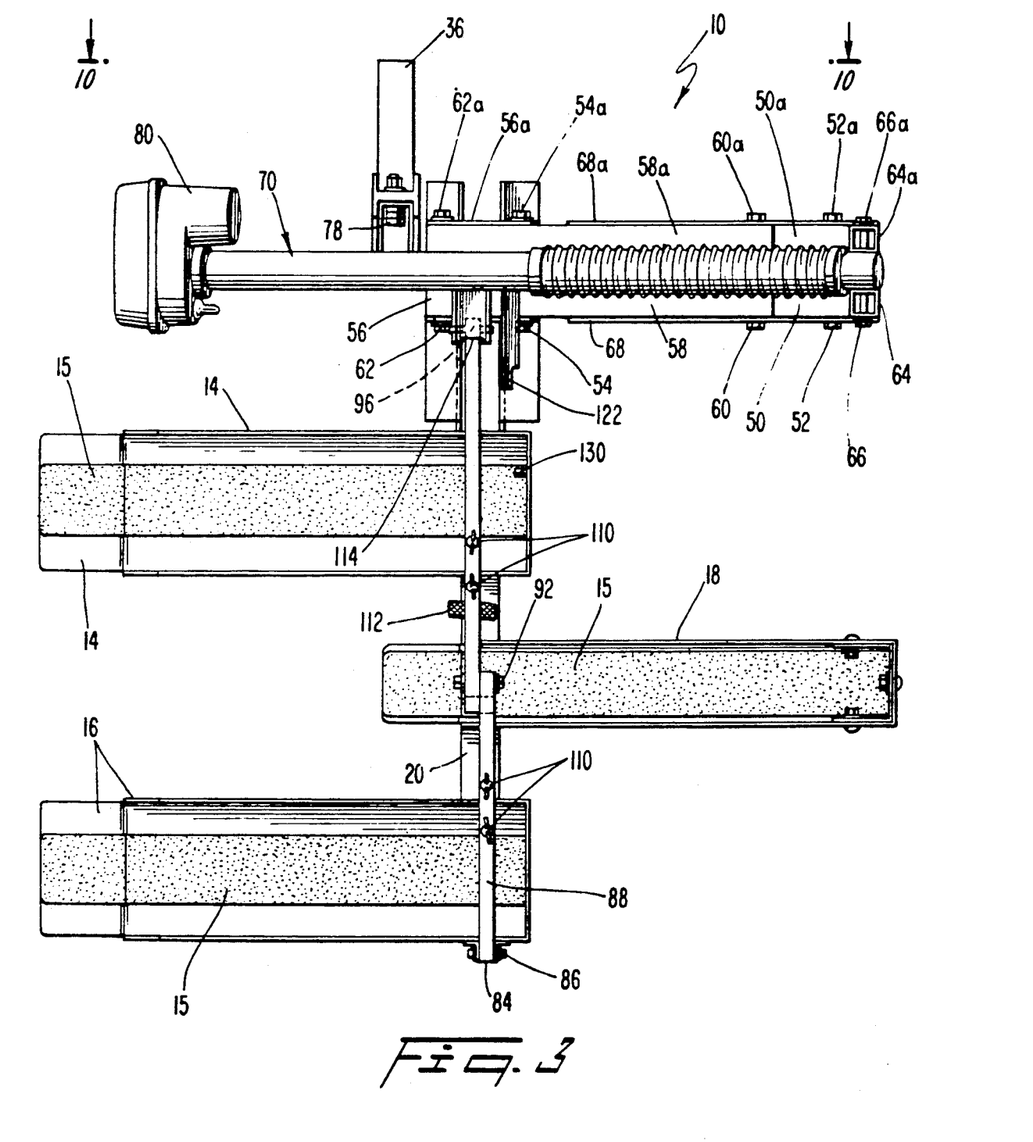
FIG. 3 is a top plan view of the apparatus.

As best shown in FIG. 3, apparatus 10 includes a vehicle support assembly that includes a pair of parallel ramp members 14, 16 that support the rear wheels of the vehicle 12. Central ramp 18 is parallel to ramps 14, 16 and supports the forward wheel 13 of vehicle 12. Guard 19 at the leading end of ramp 18 stops said front wheel 13 from rolling off the forward end of said ramp. Moreover, non-skid pad members, collectively denoted 15, perform the function their name expresses.

It should be understood from the outset that central ramp 18 could be eliminated and ramps 14, 16 could be extended to accommodate four wheeled vehicles.

Ramps 14, 16 and 18 are secured to a longitudinally extending support means in the form of a square tubular member 20. As perhaps best shown in FIG. 11, which shows the apparatus folded into its non-operative, stored configuration, so that ramps 14, 16 and 18 lie in a common vertical plane, square tubular members 22, 24 support the rear wheel ramps 14, 16, respectively, and square tubular member 26 supports central or front wheel ramp 18. The respective leading ends of members 22, 24 are welded to member 20 and the trailing end of member 26 is welded thereto as well. Thus, raising and lowering member 20 effects simultaneous and corresponding raising and lowering of members 22, 24 and 26 and their associated ramps.

Figures 4, 5:
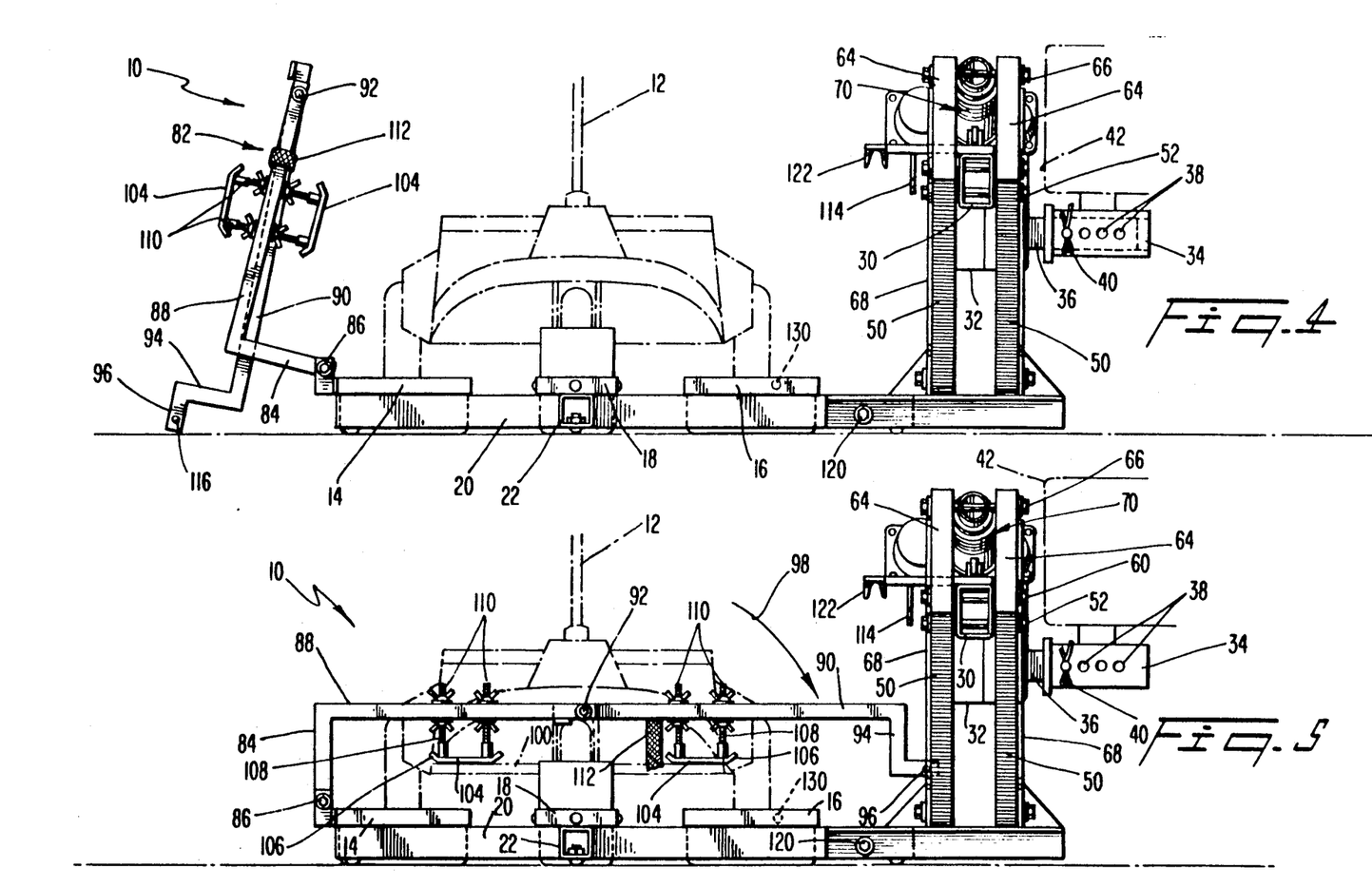
FIG. 4 is a front elevational view thereof when the apparatus is in its lowered configuration and when the vehicle hold down means is in its folded configuration.
FIG. 5 is a front elevational view similar to FIG. 4, but showing the vehicle hold down apparatus in its operative configuration.

Returning now to FIG. 1, it will there be seen that immovably mounted square tubular member 30 (which is disposed in parallel relation to the bumper of the vehicle to which the novel apparatus is attached), extends in cantilever fashion from vertical member 32 which is in turn coupled to trailer hitch 34 (dotted lines) that is positioned below the vehicle's rear bumper, not shown in FIG. 1. Hitch 34 is shown at the right hand side of FIG. 4 and 5; those Figs also depict tubular interlocking member 36 that is slidably received within hitch 34 and which is selectively adjustable with respect thereto as indicated by the pin-receiving mounting holes, collectively denoted 38, formed in hitch 34 which are alignable with cooperative pin-receiving bores formed in interlocking member 36. When selected bores and holes are aligned, a pin is inserted therethough as depicted in FIG. 4 and 5 to yoke together hitch 34 and interlocking member 36; a cotter pin 40 is then employed to hold the pin against unwanted retraction.

Figure 12:
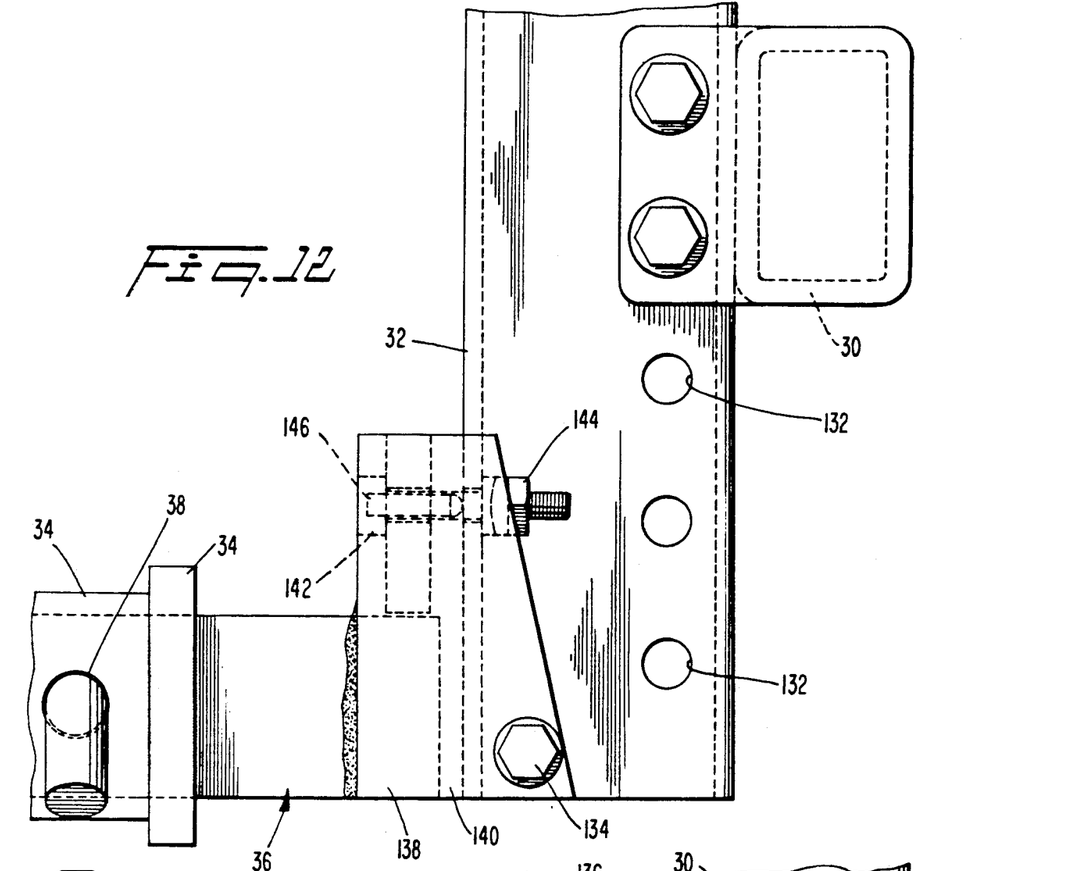
FIG. 12 is a side elevational view of the parts that permit vertical and pivotal adjustment of the apparatus.
Figure 13:
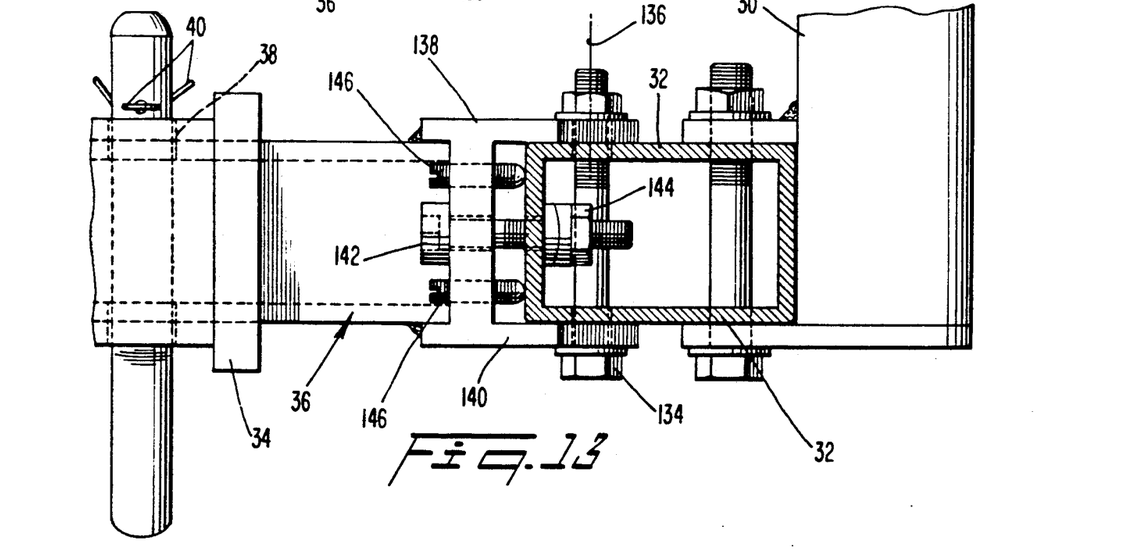
FIG. 13 is a top plan view of the parts shown in FIG. 12.

Interlocking member 36 is pivotally mounted to vertical member 32, as best shown in FIGS. 12 and 13, but means are provided to prevent unwanted pivoting as will be explained when said Figs. are described. It should be clear, then, that hitch 34, interlocking member 36 slidably received therewithin, vertical member 32 and immovable member 30 are all stationary once the apparatus 10 has been coupled to the vehicle. The reference numeral 42 represents the vehicle's bumper in FIGS. 4 and 5.

There are no other means for attaching apparatus 10 to the vehicle; this single point of attachment is an important feature of this invention.

Immovable member 30 serves as the base means for the linkage that raises and lowers the ramp-supporting frame that includes longitudinally extending member 20 and the transversely disposed members 22, 24 and 26 welded thereto. Vertical member 32 is telescopically received within a complementally formed vertical member that depends from immovable member 30 so that the entire apparatus is vertically adjustable, as will be set forth in connection with FIGS. 12 and 13.

The linkage includes a pair of identical assemblies of square link members. The assemblies are pivotally mounted at a first end to opposite sides of the immovable member 30 and are pivotally mounted at a second end to a pair of upstanding ear members. The ear members are positioned at right angles to a plate 21 that overlies and is supported by the ramp-interconnecting longitudinally extending member 20.

More particularly, a leading end of link member 50 (see FIGS. 1 and 2) is pivotally mounted as at 52 to a leading end of immovable member 30 and is pivotally mounted as at 54 to a leading end of its associated ear member 56.

Figure 2:
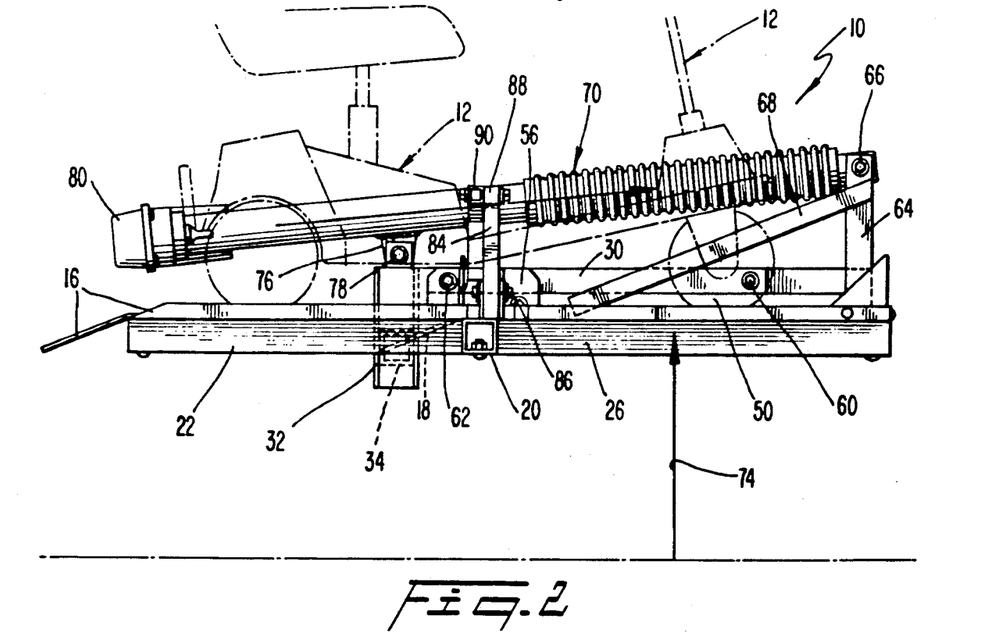
FIG. 2 is a side elevational view of the apparatus of FIG. 1 in its raised configuration.

The leading end of a second link member 58 of straight configuration is pivotally mounted as at 60 to the immovable member 30, and its trailing end is pivotally mounted as at 62 to a trailing end of said ear 56. Note that pivot point 54 is lower than pivot point 62, and that pivot point 60 is higher than pivot point 52.

A truncate link member 64 is welded to the leading end of link 50 in perpendicular relation thereto and accordingly rotates in a vertical plane conjointly with said link 50; it is adjacent immovable member 30 but is not attached thereto. Truncate link 64 and elongate link 50 are braced by a diagonally disposed brace 68; said brace 68 is welded at its opposite ends to the link members it braces.

The free end of truncate link 64 is pivotally mounted as at 66 to a telescoping member 70.

It will now be apparent that extension of telescoping member 70 in the direction of directional arrow 72 (FIG. 1) will cause elongate members 50 and 58 to pivot about their respective pivot points until the configuration of FIG. 2 is attained, and that pivoting results in the raising of the ramps and support frame from the road's surface as indicated by the arrow 74 in FIG. 2. When fully raised as depicted in FIG. 2, elongate links 50 and 58 are in abutting relation to one another and are substantially parallel to the road surface. It should be understood that the vehicle 12 is transported across the public roads when the apparatus is elevated as depicted in FIG. 2.

The linkage assembly and pivot points on the opposite side of immovable member 30 are shown in FIG. 3. The parts that correspond to the above-described parts are provided with the suffix "a."

Vertical member 32 that telescopically receives and supports the immovable member 30 also supports the telescoping member 70. The mounting bracket, welded atop vertical member 32, is denoted 76 in FIGS. 1 and 2. Telescoping member 70 is pivotally mounted to said bracket 76 as at 78.

Although many different means may be employed to effect retraction and extension of telescoping member 70, the preferred means is a screw and nut member, as depicted in a broken away part of FIG. 1. A motor and gear box 80, mounted at the trailing end of member 70, provides power to the screw and nut; the motor is preferably electric and is conductivly coupled to the vehicle's electrical system by conductors, not shown. A button 81 is spring-loaded and activates motor 80 when pressed.

FIGS. 4 and 5 best depict a link assembly that is provided to secure vehicle 12 when it is parked on the apparatus 10. In FIG. 4, the assembly is denoted 82 as a whole and is shown in its uncoupled configuration. Its deployed configuration is shown in FIG. 5. Truncate square tubular link member 84 is pivotally mounted as at 86 to the outermost ramp member. Elongate straight link 88 is welded to the free end of link 84 in orthogonal relation thereto. Another straight elongate link 90 is pivotally mounted as at 92 to the free end of link 88. Truncate link 94 is welded to the free end of link 90 and a final link 96 is welded to link 94 in orthogonal relation thereto. Of course, integral formation of the parts is an acceptable alternative to welding. Directional arrow 98 in FIG. 5 indicates how the described linkage is deployed into its operative configuration from its folded configuration.

A pair of adjustable holding devices bear down on the vehicle's floor board 100 when assembly 83 is deployed, as shown in FIG. 5. Each holding device includes a plate 104 having internally threaded bosses 106 for receiving screws 108 that are axially adjustable relative to their associated link members 88, 90 through manipulation of wing nuts 110. This adjustable feature enables the carrier 10 to transport vehicles 12 of differing sizes. Strap 112, shown dangling from link member 90 between holding pads 104 and pivot point 92, is used only when the hold down assembly is not in use as shown in FIG. 4; note in that figure how strap 112, which may be of the hook and loop type, wraps around links 88 and 90 to hold the assembly in the folded configuration.

Figures 6, 7, 8, 9:
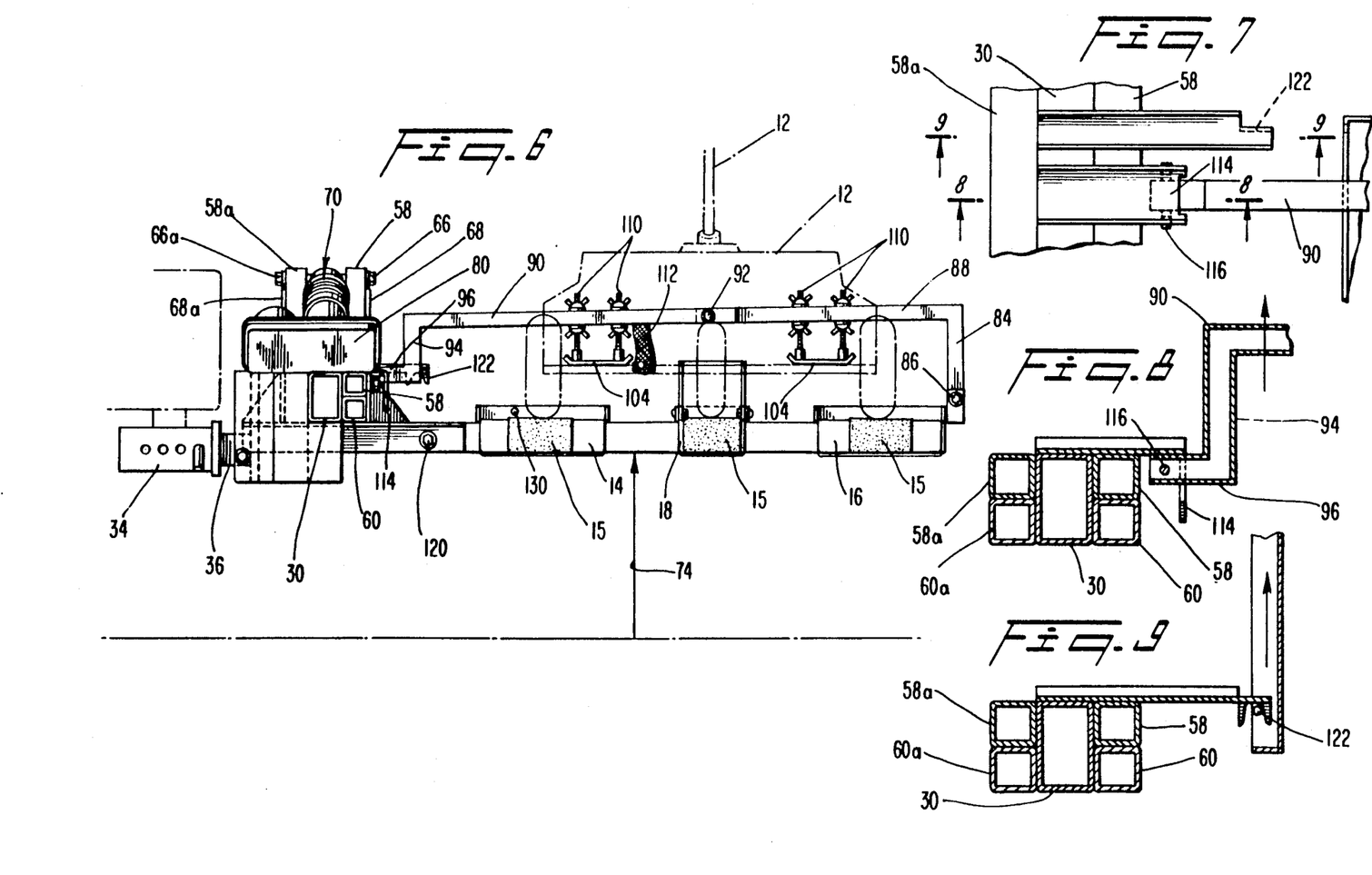
FIG. 6 is a rear elevational view of the apparatus in its raised configuration.
FIG. 7 is a detailed, top plan view of a part of the vehicle hold down assembly.
FIG. 8 is a sectional view taken along line 8—8 in FIG. 7.
FIG. 9 is a sectional view taken along line 9—9 in FIG. 7.
Figure 10:
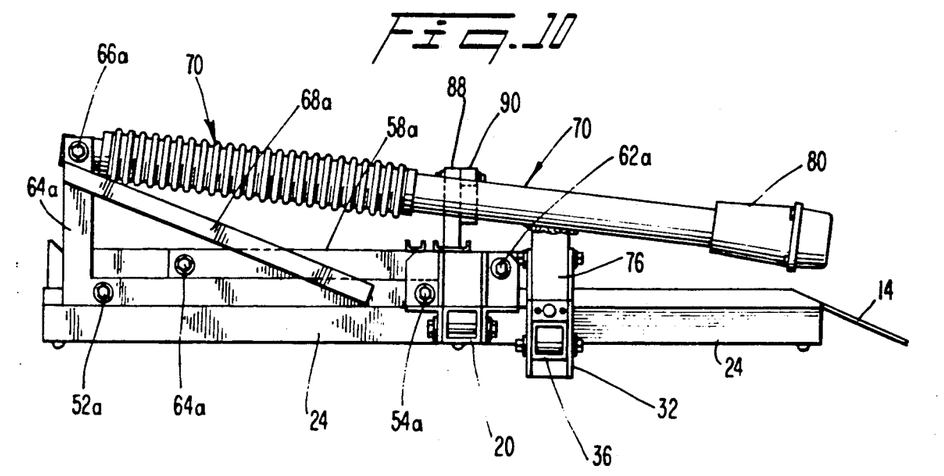
FIG. 10 is an elevational view taken along line 10—10 in FIG. 3.

To hold down the assembly 82, latch means are provided that engage the free end of truncate link 96, but only when the carrier 10 is in its raised position. It will be noted in FIG. 5 that nothing holds down the assembly when carrier 10 is in its lowered position Note, however, bracket 114 that is positioned directly above link 96; said bracket 114 serves as the latch means. When carrier 10 is raised, link 96 is accepted into bracket 114 and held against further upwardly directed travel by said bracket. FIG. 8 shows this in greater detail; link 96 is there shown in its raised configuration. Bracket 114 is a centrally slotted plate as indicated in said FIG. 8; note that bracket 114 is an "L"-shaped member that is secured atop immovable member 30. Link 96 enters into the slot and is barred from further upward travel, thereby locking hold down assembly 82 in its operative configuration. Pivot pin 116 enables pivoting of the hold down assembly 82 when carrier 10 is folded into the storage position depicted in FIG. 11.

Figure 11:
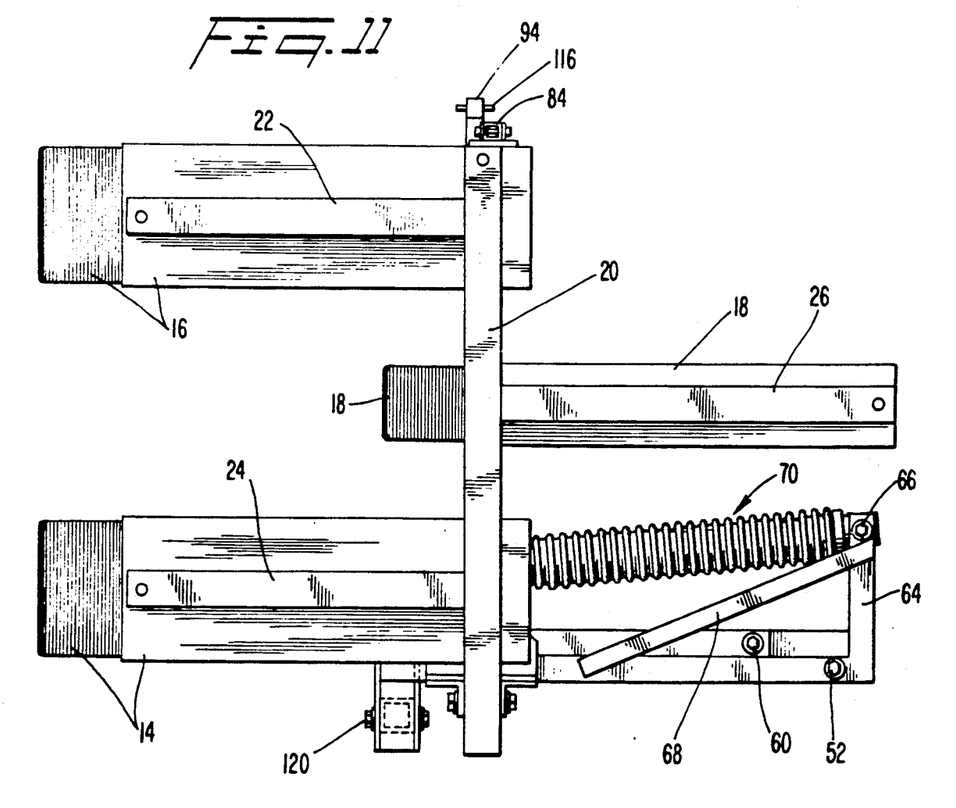
FIG. 11 is a front elevational view of the apparatus when in its folded configuration.

Pin 120 in FIG. 11 is the pivotal axis for apparatus 10; it is also shown in FIGS. 4, 5, and 6. Latch 122 (FIGS. 4 and 5), spaced vertically above hinge pin 120, engages retainer pin 130 (FIGS. 3, 5 and 6) to hold apparatus 10 in its folded configuration. More particularly, the apparatus is folded when in its lowered configuration; this aligns pin 130 and latch 122. Pin 130 enters latch 122 when the apparatus is lifted.

FIGS. 12 and 13 show a structure that allows vertical adjustment of the apparatus and which accommodates the apparatus to trailer hitches that are not positioned in a perfectly horizontal plane.

As shown in FIG. 12, vertical member 32 is provided with a plurality of vertically spaced apertures, collectively denoted 132. Immovable member 30 has a similarly apertured depending sleeve that telescopically receives vertical member 32. When apparatus 10 is raised to its desired height (maximum height is desirable), a pair of bolts, secured by nuts, are extended through the aligned apertures of vertical member 32 and said apertured sleeve that depends from immovable member 30, thereby locking the apparatus into its desired position of vertical adjustment.

Hitch interconnecting member 36 is pivotally mounted to vertical member 32, as mentioned above. This pivotal mounting is needed because hitch 34 will seldom be mounted in a perfectly horizontal plane. However, once vertical member 32 is pivoted with respect to member 36 until member 32 is in the desired vertical plane, means must be provided to lock such members in such operable position.

The members are pivotal about pivot bolt 134 (FIG. 12) that defines pivot axis 136 (FIG. 13), and which extends through plates 138, 140 that are positioned on opposite sides of members 32 and 36 as best shown in FIG. 13.

An Allen head bolt 142 engages a swivel screw 144; note that the pivotal axis of the swivel screw 144 is in alignment with pivotal axis 136 defined by pivot bolt 134. A pair of set screws, collectively denoted 146, flank bolt 142, as best shown in FIG. 13. Thus, once vertical member 32 is positioned in a vertical plane said set screws are advanced until they bear against surface 148 to thereby lock the assembly in place.

This invention is clearly new and useful. Moreover, it was not obvious to those of ordinary skill in this art at the time it was made, in view of the prior art considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An apparatus attachable to a large vehicle for carrying a smaller vehicle, comprising:

a plurality of ramp members;

said ramp members being rigidly interconnected to one another and being disposed in a common plane;

an interlocking member for interconnecting said ramp members to a hitch that is mounted to said large vehicle;

a vertical member that is pivotally secured to a free end of said interlocking member;

an immovable member that surmounts and engages said vertical member;

a telescoping member that surmounts said immovable member;

a generally "L"-shaped linkage means having a first end pivotally secured to a free end of said telescoping member and a second end pivotally interconnected to said ramp members;

said telescoping member and said linkage means being transversely disposed relative to a longitudinal axis of said large vehicle; and motor means for effecting extension and retraction of said telescoping member and hence raising and lowering of said ramp members.

2. The apparatus of claim 1, further comprising a hinge means for selectively positioning said ramp members in a substantially horizontal and a substantially vertical plane.

3. The apparatus of claim 2, further comprising a hold down means for holding said smaller vehicle to said apparatus so that the wheels of said smaller vehicle remain upon said ramp members when the smaller vehicle is being transported on said apparatus by said large vehicle.

4. The apparatus of claim 3, further comprising means for locking said vertical member and said interlocking member in fixed angular relation to one another so that said vertical member is positionable in a substantially vertical plane even when said hitch means to which said interlocking member is engaged is in a plane oblique to a horizontal plane.

5. The apparatus of claim 4, further comprising a longitudinally extending member, said ramp members being rigidly interconnected to said longitudinally extending member so that raising, lowering, and folding of said longitudinally extending member effects simultaneous and corresponding motion of said ramp members, and said second end of said "L"-shaped linkage means being interconnected to said longitudinally extending member.

6. The apparatus of claim 5, further comprising a plate member that overlies and is fixedly secured to said longitudinally extending member, an ear means that projects from said plate member, and said second end of said "L"-shaped linkage means being pivotally secured to said ear means.

7. The apparatus of claim 6, wherein said hinge means includes a pivot point formed in said longitudinally extending member, said pivot point being positioned between said ramp members and said linkage means.

8. The apparatus of claim 1, wherein said telescoping member comprises a screw and nut member.

9. The apparatus of claim 1, wherein said interlocking member is a generally square in transverse section member that telescopically receives said hitch means, said hitch means being complementally formed, and wherein plural transverse apertures are formed in said interlocking member and said hinge means, whereby alignment of preselected apertures enables said interlocking member and said hinge means to be interconnected upon passing a pin means through said preselected apertures.

10. The apparatus of claim 4, wherein said means for locking said vertical member and said interlocking member in fixed angular relation to one another includes a bolt member that extends from said interlocking member and that has a free end that bears against said vertical member, and a pair of set screws disposed in flanking relation to said bolt member, on opposite sides thereof, said set screws being axially movable and having free ends adapted to bear against said vertical member.

11. The apparatus of claim 3, wherein said hold down means includes a foldable linkage assembly having an outer end pivotally secured to an outermost ramp member and having a free end selectively securable to a latch means when said apparatus is in its raised configuration, said latch means being a bracket secured to said immovable member.

12. The apparatus of claim 11, wherein said hold down means further includes at least one holding pad adapted to depend from said foldable linkage assembly when said assembly is deployed to hold down said smaller vehicle, said at least one holding pad being vertically adjustable and being configured to bear down against a preselected part of said smaller vehicle to retain it against movement when being transported by said large vehicle.

13. The apparatus of claim 2, further comprising means for holding said ramp members in said substantially vertical plane when said ramp members are positioned in said substantially vertical plane, said means for holding including a pin member secured to an innermost ramp member and a latch member that engages and holds said pin member when said ramp members are positioned in said substantially vertical plane.

14. The apparatus of claim 13, wherein said latch member is secured to said immovably mounted member and wherein said pin member engages said latch member only when said ramp members are in their raised configuration.

15. The apparatus of claim 6, wherein said "L"-shaped linkage means includes a pair of "L"-shaped link members, said link members being positioned on opposite sides of said immovable member, each link member including a truncate part and an elongate part, said respective truncate and elongate parts being fixedly secured to one another in perpendicular relation to one another, said telescoping member being pivotally secured to a free end of said respective truncate parts and said respective elongate parts being pivotally secured to said immovable member.

16. The apparatus of claim 15, further comprising a straight link member having a first end pivotally secured to said immovably mounted member and a second end pivotally secured to an associated ear member.

17. The apparatus of claim 16, further comprising a pair of brace members, each brace member being fixedly secured in bracing relation to said truncate and elongate link members.

18. The apparatus of claim 1, wherein said plurality of ramp members is three, and wherein said three ramp members include a pair of laterally spaced ramp members for supporting the rear wheels of said three wheeled smaller vehicle and a single leading ramp positioned between and extending beyond said pair of ramp members, said leading ramp supporting a leading wheel of said three wheeled smaller vehicle.

19. The apparatus of claim 18, further comprising a longitudinally extending support member for supporting said three ramp members, said laterally spaced ramp members being secured at their respective leading ends to said longitudinally extending support member and said leading ramp member being secured at its trailing end to said longitudinally extending support member.

20. The apparatus of claim 19, further comprising a switch means for selectively activating said motor means.

* * * * *